(12) United States Patent
Wang et al.

(10) Patent No.: US 12,400,328 B2
(45) Date of Patent: Aug. 26, 2025

(54) METHOD FOR DELETING REDUNDANT IMAGES OF ENDOSCOPE

(71) Applicant: NATIONAL CHUNG CHENG UNIVERSITY, Chiayi County (TW)

(72) Inventors: Hsiang-Chen Wang, Chiayi (TW); Yu-Ming Tsao, Chiayi County (TW); Arvind Mukundan, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 310 days.

(21) Appl. No.: 18/350,140

(22) Filed: Jul. 11, 2023

(65) Prior Publication Data

US 2024/0386548 A1 Nov. 21, 2024

(30) Foreign Application Priority Data

May 18, 2023 (TW) .................. 112118548

(51) Int. Cl.
*G06K 9/00* (2022.01)
*G06T 3/40* (2006.01)
*G06T 7/00* (2017.01)
*G06V 10/44* (2022.01)
(Continued)

(52) U.S. Cl.
CPC .............. *G06T 7/0012* (2013.01); *G06T 3/40* (2013.01); *G06V 10/44* (2022.01); *G06V 10/56* (2022.01); *G06V 10/761* (2022.01); *G06T 2207/10036* (2013.01); *G06T 2207/10068* (2013.01)

(58) Field of Classification Search
CPC ........... G06K 9/00; G06T 7/00; H04N 23/843
USPC ....... 382/100, 103, 106, 128–132, 154, 158, 382/172, 181, 199, 219, 224, 254, 382/285–291, 305, 321; 600/111, 332; 348/E9.005; 378/4, 21
See application file for complete search history.

(56) References Cited

U.S. PATENT DOCUMENTS

| | | | | |
|---|---|---|---|---|
| 2012/0307116 A1* | 12/2012 | Lansel | ................ | H04N 23/843 348/E9.005 |
| 2015/0374210 A1* | 12/2015 | Durr | ................ | A61B 1/000096 600/111 |
| 2016/0299170 A1* | 10/2016 | Ito | ................ | G02B 23/26 |

(Continued)

OTHER PUBLICATIONS

De-redundancy in wireless capsule endoscopy video sequences using correspondence matching and motion analysis Libin Lan1,2,3 • Chunxiao Ye2,3 • Chao Liao2,3 • Chengliang Wang2,3 • Xin Feng1 (Year: 2024).*

*Primary Examiner* — Seyed H Azarian
(74) *Attorney, Agent, or Firm* — Rosenberg, Klein & Lee

(57) ABSTRACT

The present application related to a method for deleting redundant images of an endoscope. Firstly, a host receives an input image datum from an endoscopy, hereby, capturing a plurality of corresponded input images from the input image data. Next, a plurality of dimension reduction data are obtained to operate with at least one adjacent dimension reduction datum, and then, a plurality of root mean squared error values are obtained to compare with an error threshold value. Hereby, at least one image unarrived the error threshold value are deleted to obtain a plurality of screened images. Thus, redundant images in the input image data of the endoscopy will be deleted to prevent from performing an image analysis of same images or approximated images.

9 Claims, 14 Drawing Sheets

(51) Int. Cl.
*G06V 10/56* (2022.01)
*G06V 10/74* (2022.01)

(56) References Cited

U.S. PATENT DOCUMENTS

| | | | |
|---|---|---|---|
| 2024/0212811 A1* | 6/2024 | Vogler | G06N 3/0455 |
| 2024/0386548 A1* | 11/2024 | Wang | G06T 7/0012 |
| 2025/0184584 A1* | 6/2025 | Liang | G01J 3/2823 |

* cited by examiner

METHOD FOR DELETING REDUNDANT IMAGES OF ENDOSCOPE

FIELD OF THE INVENTION

The present invention relates to a method for image processing, especially to a method for deleting redundant images of endoscopes.

BACKGROUND OF THE INVENTION

Most of medical techniques for disease diagnosis available now depend on a single type of indicator or a piece of information such as body temperature, blood pressure, and body scan images. For example, in order to detect serious diseases such as cancer, the most common medical device used now is image-based equipment including X-ray, computer tomography (CT) scan, nuclear magnetic resonance (NMR) imaging, etc. Various combinations of these techniques are useful in disease diagnosis in some degrees. Yet early detection of the serious diseases is not so accurate, reliable, effective and economical when the above equipment is used alone. Moreover, most of the devices are invasive and having larger volume such as those using X-ray, CT, and NMR imaging techniques. Thus endoscopes have been developed for observation of lesions on digestive organs or gastrointestinal tract.

The endoscope is a medical instrument able to enter human body through many different ways and used to observe the inside of the body. The endoscopes have been used widely in a variety of medical applications and have significant impact on the field because the endoscope can be inserted into body cavities unable to be observed directly and capturing images therein. An endoscopy is an examination procedure using the endoscope. Some specially designed endoscopes such as cystoscope, gastroscope, colonoscope, bronchoscope, laparoscope, and anthroscopy are used to perform surgical procedures besides imaging capture. For example, esophagus is a tubular organ which connects the pharynx to the stomach for sending food ingested through the mouth to the stomach. The normal esophageal mucosa includes multiple layers of squamous epithelial cells with thickness of 200-500 μm. The multiple layers consist of epithelium (EP), lamina propria mucosae (LPM), muscularis mucosae (MM), submucosa (SM), and muscularis propria (MP) from top to bottom. A gastrointestinal endoscope is inserted toward the stomach to observe esophagus and deal with lesions on the esophagus.

Furthermore, detection of esophageal diseases at early stage is not easy. Besides nearly no symptoms, a part of people with subtle changes such as a bit change in colors of the tissue are unable to be identified even using endoscopic examination. Thus a large amount of patients with early-stage esophageal lesions are unable to be diagnosed and thus the treatment is delayed. In order to detect lesions which are not easy to spot, several techniques including Lugol chromoendoscopy, narrow band image (NBI), and magnifying endoscopy have been developed.

However, images captured during each time of the endoscopic examination, often over seventy-five thousand images, and this a huge amount of data is produced. Even the resolution of 640×480 pixels is used to avoid too much data in image files, computation of large amount of data is still a problem while using the endoscopic examination for image recognition.

In order to solve the above problem, the present invention provides a method for deleting redundant images of endoscopes. A host retrieves a plurality of input images from input image data. Then a plurality of corresponding dimensionality reduction feature data is obtained after dimensionality reduction. Next the respective dimensionality reduction feature data is compared with at least one adjacent dimensionality reduction feature data to get a plurality of root-mean-square error (RMSE) values. Then the plurality of RMSE values are compared with an error threshold value to obtain an error comparison result. Later images with the RMSE values not reaching the error threshold value are removed according to the error comparison result to get a plurality of screened images. Lastly the corresponding input images of the input image data are retained according to the screened images. Thereby the problem of huge amount of data needs to be processed during image recognition can be solved.

SUMMARY

Therefore, it is a primary object of the present invention to provide a method for deleting redundant images of endoscopes in which a plurality of dimensionality reduction feature data is obtained by a host executing dimensionality reduction on a plurality of input images. Then the host compares the respective dimensionality reduction feature data with at least one adjacent dimensionality reduction feature data to get a plurality of root-mean-square error (RMSE) values. Next the RMSE values are compared with an error threshold value to obtain a plurality of screened images. Then the input images are modified according to the screened images and redundant images of input image data are removed so as to avoid the issue of huge amount of data obtained during image recognition.

In order to achieve the above object, a method for deleting redundant images of endoscopes includes a plurality of steps. First a host obtains an input image data of an endoscope. Then the host retrieves a plurality of input images from the input image data and runs certain steps to get a plurality of dimensionality reduction feature data. The input images are converted into a plurality of hyperspectral images according to a hyperspectral reference data. Then a principal component analysis (PCA) is executed to generate a plurality of dimensionality reduced images according to the hyperspectral images. Next an image analysis is performed on the dimensionality reduced images to get a plurality of dimensionality reduction feature data. After getting the dimensionality reduction feature data, the host performs an error calculation between each of the dimensionality reduction feature data ranging from the second dimensionality reduction feature data to the last dimensionality reduction feature data and at least one of the adjacent dimensionality reduced feature data to get a plurality of root-mean-square error (RMSE) values. Then the host compares the plurality of RMSE values with an error threshold value to obtain an error comparison result. Later the host deletes at least one of the dimensionality reduced images corresponding to at least one of the RMSE values not reaching the error threshold value according to the error comparison result to get a plurality of screened images. Lastly the host modifies the input image data according to the screened images. Thereby redundant images in the input image data can be removed automatically and the problem of huge amount of data which needs to be processed during image recognition can be solved.

Preferably, the input image data is a static image data or a dynamic image data.

Preferably, in the step of retrieving a plurality of input images from the input image data, the host retrieves at least a part of image data from the input image data and converts the image data into frames to get the input images.

Preferably, the hyperspectral reference data is corresponding to the endoscope.

Preferably, in the step of executing a principal component analysis (PCA) to generate a plurality of dimensionality reduced images according to the hyperspectral images, the host converts the hyperspectral images into a plurality of gray-scale images and reduces resolution to generate the plurality of dimensionality reduced images.

Preferably, in the step of performing an image analysis on the dimensionality reduced images to get a plurality of dimensionality reduction feature data, the host performs a feature extraction according to a plurality of feature points and an analysis vector of the dimensionality reduced images to get the corresponding dimensionality reduced feature data according to the dimensionality reduced images.

Preferably, in the step of getting a plurality of root-mean-square error (RMSE) values by comparing each of the dimensionality reduction feature data ranging from the second dimensionality reduction feature data to the last dimensionality reduction feature data with at least one of the adjacent dimensionality reduced feature data to get a plurality of RMSE values, the host compares the respective dimensionality reduction feature data ranging from the second dimensionality reduction feature data to the last dimensionality reduction feature data with at least the previous one adjacent dimensionality reduced feature data to get the plurality of RMSE values.

Preferably, in the step of getting a plurality of root-mean-square error (RMSE) values by comparing each of the dimensionality reduction feature data ranging from the second dimensionality reduction feature data to the last dimensionality reduction feature data with at least one of the adjacent dimensionality reduced feature data to get a plurality of RMSE values, the host compares the respective dimensionality reduction feature data ranging from the second dimensionality reduction feature data to the last dimensionality reduction feature data with at least the previous one and the next one adjacent dimensionality reduced feature data to get the plurality of root-mean-square error (RMSE) values.

Preferably, in the step of comparing the plurality of RMSE values with an error threshold value to obtain an error comparison result, the host reads the error threshold value stored in a storage unit or receives the error threshold value input by an input device.

Preferably, in the step of modifying the input image data according to the screened images, according to an order of the screened images corresponding to the input images, the host retains a part of the input images in the input image data and deletes the rest of the input images.

DETAILED DESCRIPTION

In order to make the structure and characteristics as well as the effectiveness of the present application to be further understood and recognized, the detailed description of the present application is provided as follows along with embodiments and accompanying figures.

The input image data of the endoscopes needs a huge amount of computation and this further leads to difficulty in image processing and recognition. Thus a method for deleting redundant images of endoscopes is provided by the present invention to solve the problem.

Features of a method for deleting redundant images of endoscopes according to the present invention together with a system used in combination with the method are further provided in the following embodiments.

Figure 1:
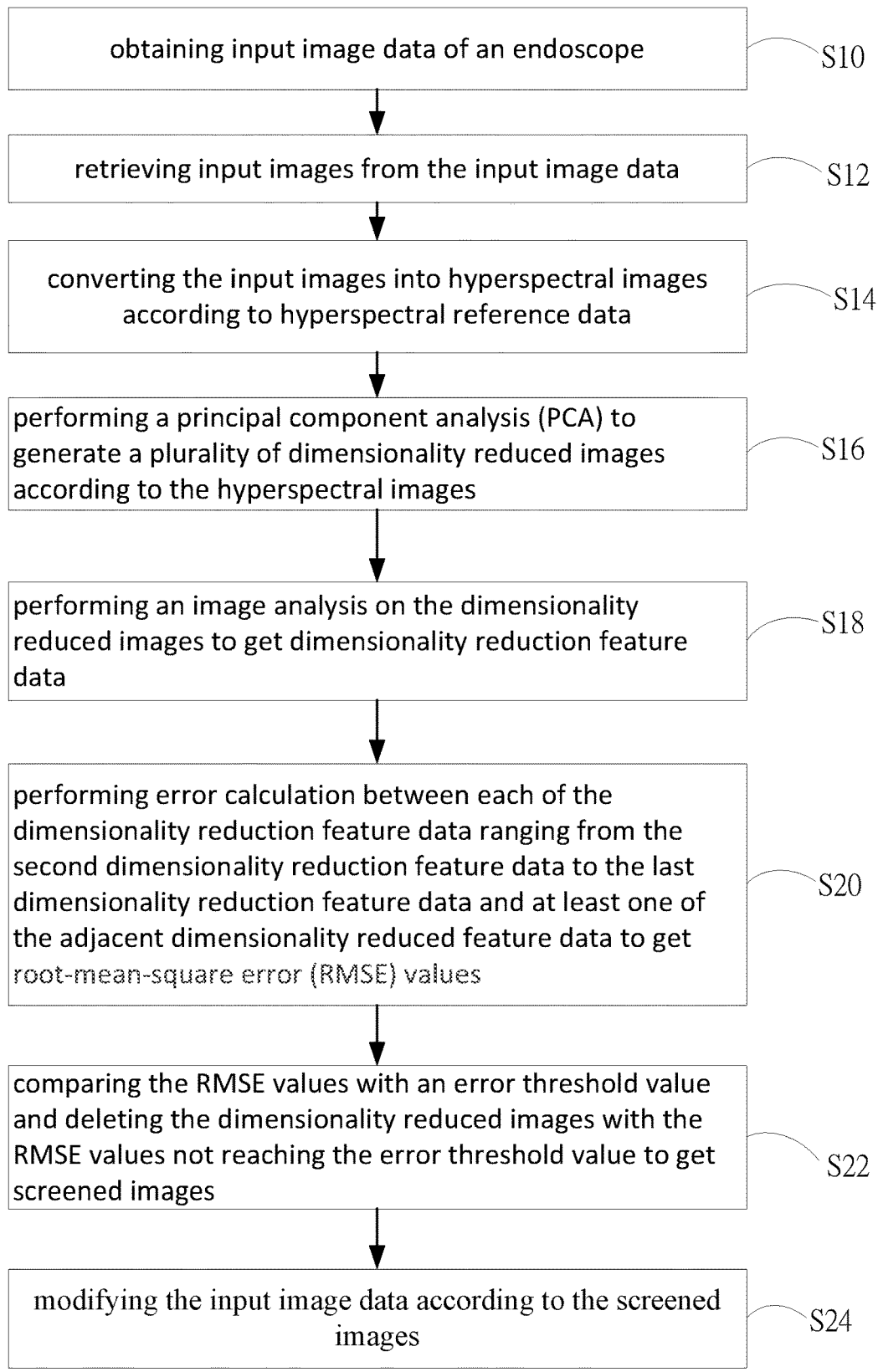
FIG. 1 is a flow chart showing steps of a method for deleting redundant images of endoscopes of a first embodiment according to the present invention.

Refer to FIG. 1, a method for deleting redundant images of endoscopes according to the present invention has the following steps.

Step S10: obtaining input image data of an endoscope;
Step S12: retrieving input images from the input image data;
Step S14: converting the input images into hyperspectral images according to hyperspectral reference data;
Step S16: performing a principal component analysis (PCA) to generate a plurality of dimensionality reduced images according to the hyperspectral images;
Step S18: performing an image analysis on the dimensionality reduced images to get dimensionality reduction feature data;
Step S20: performing error calculation between each of the dimensionality reduction feature data ranging from the second dimensionality reduction feature data to the last dimensionality reduction feature data and at least one of the adjacent dimensionality reduced feature data to get root-mean-square error (RMSE) values;
Step S22: comparing the RMSE values with an error threshold value and deleting the dimensionality reduced images with the RMSE values not reaching the error threshold value to get screened images;
Step S24: modifying the input image data according to the screened images.

Refer to FIG. 2A-2H, a detection system 1 which is used in combination with the method for deleting redundant images of endoscopes according to the present invention includes a host 10 and an endoscope 20. In this embodiment, the host 10 is a main computer which consists of a processing unit 12, a memory 14, and a storage unit 16. But the host 10 is not limited to the main computer. It can also be a server, a laptop computer, a tablet computer, or an electronic with basic arithmetic and logic operation. A database 30 is built in the storage unit 16, but not limited. The storage unit 16 can be an external storage unit and that means the database 30 is arranged outside the host 10. The host 10 executes a de-redundancy program P by the processing unit 12. The endoscope 20 is a device used to detect organs and tissues in human bodies such as cystoscope, gastroscope, colonoscope, bronchoscope, and laparoscope.

Figure 2A:
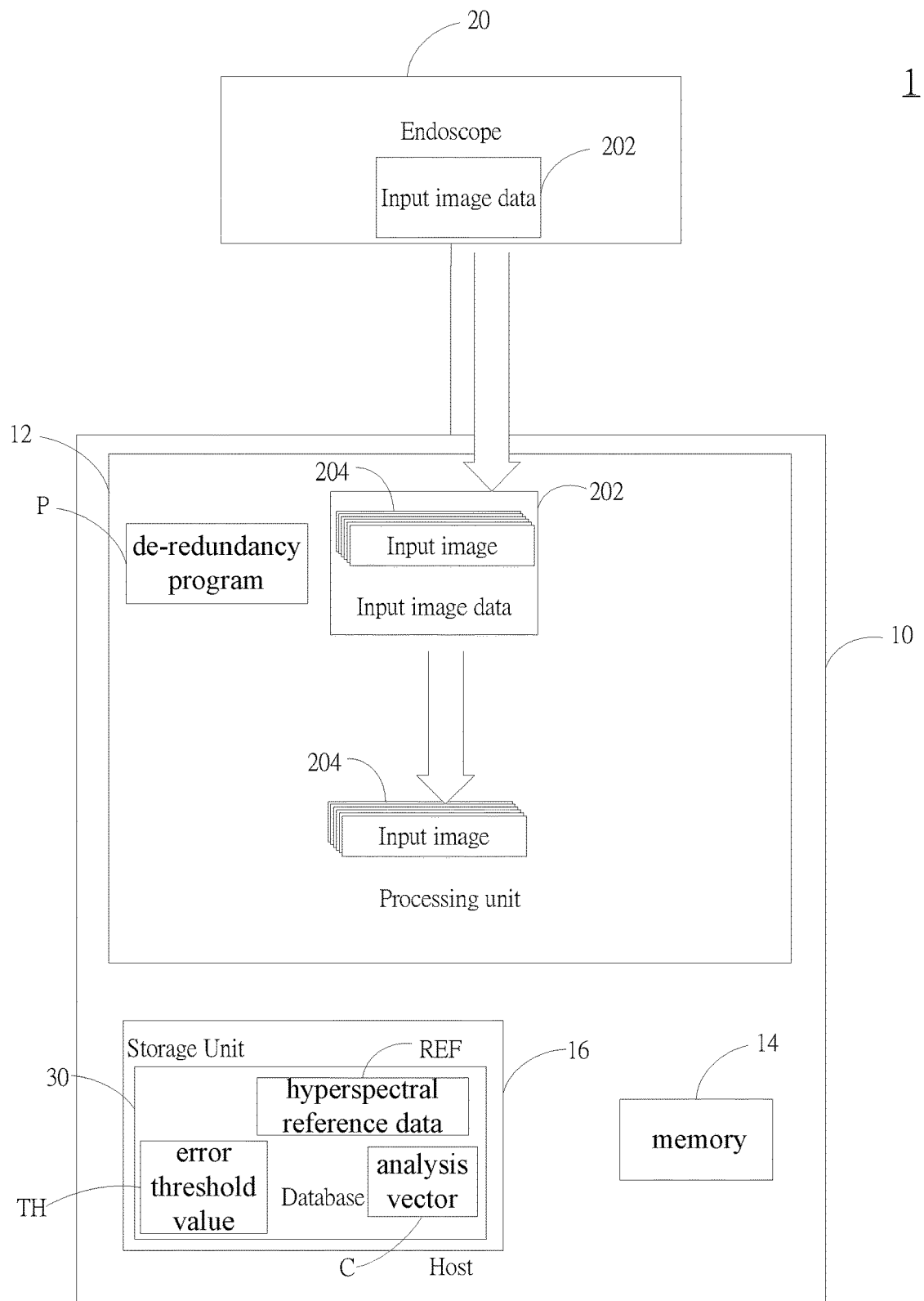
FIG. 2A-2H are schematic drawings showing a part of steps of the first embodiment according to the present invention.

As shown in FIG. 2A, in the step S10, the host 10 is used to read an input image data 202 captured by the endoscope 20. The input image data 202 is a static image data or a dynamic image data. The input image data 202 can be a white light image stored in the database 30. In this embodiment, the endoscope 20 gets corresponding white light images by OLYMPUS EVIS LUCERA CV-260 SL endoscopy system. Refer to FIG. 2A, in the step S12, the host 10 further retrieves a plurality of input images 204 from the input image data 202. The host 10 retrieves at least a part of image data from the input image data 202 and converts the image data into frames to get the input images 204. In this embodiment, the input images 204 are the white light images captured by the endoscope 20.

Figure 2B:
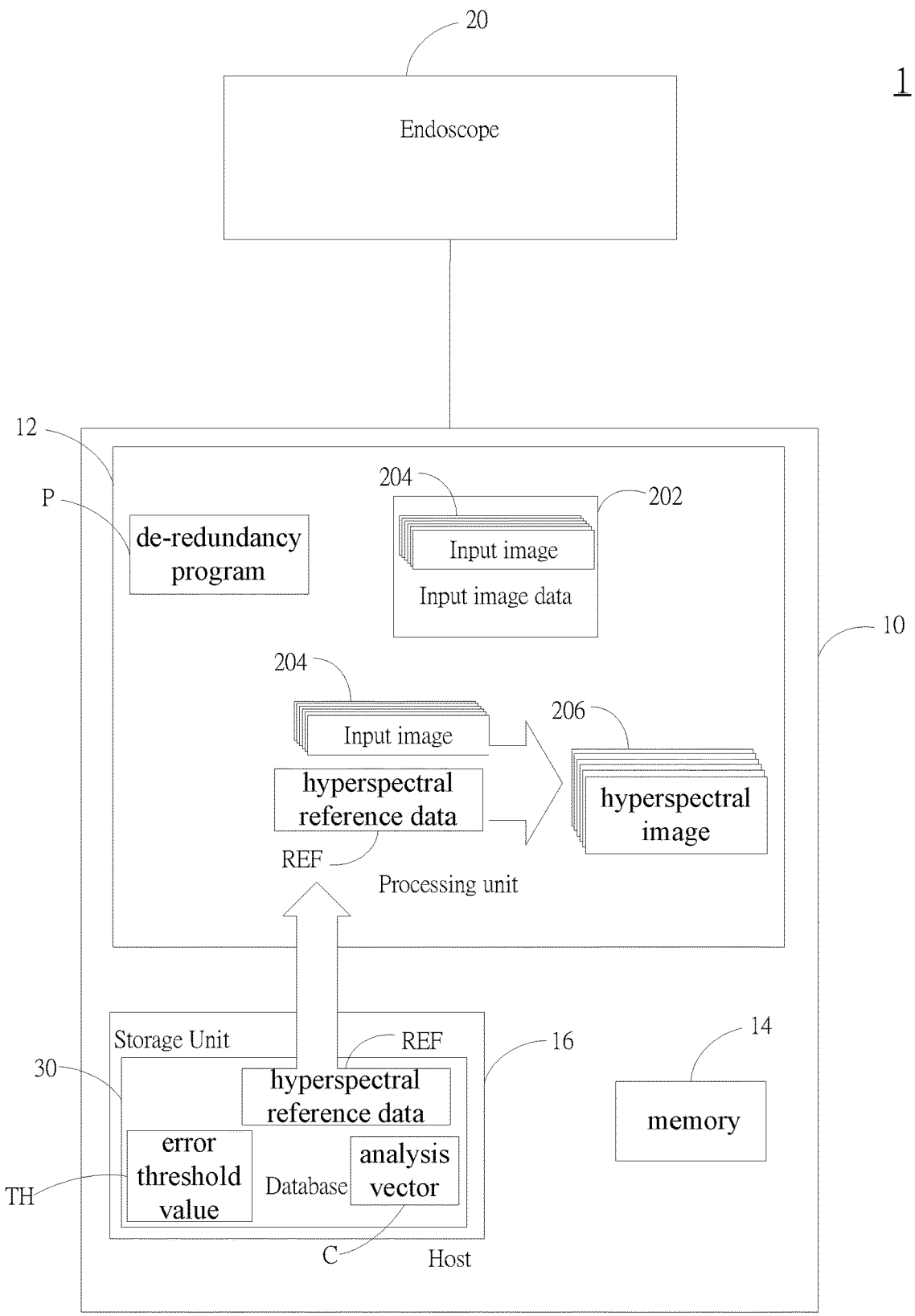

As shown in FIG. 2B, the host 10 runs the step S14. The host 10 reads a hyperspectral reference data REF from the database 30 according to the input image data 202 and then converts the input images 204 into hyperspectral images 206. That means Visible Hyperspectral Algorithm (VIS-HAS) is used to compute the input images 204 captured by the endoscope 20 for getting the hyperspectral images 206 being converted from general color space (color space of the captured image) to XYZ color space (CIE 1931 XYZ Color space) such as from sRGB to XYZ color space. The hyperspectral imaging information in the present invention is corresponding to visible wavelengths of visible Hyperspectral Algorithm and 24 Color Checkers (X-Rite Classic). For example, the 24 color checkers includes white, black, four neutral grays, blue, green, red, yellow, magenta, cyan, orange, purplish blue, moderate red, purple, yellow green, orange yellow, dark skin, light skin, blue sky, foliage, blue flower, and bluish green. The hyperspectral reference data REF is corresponding to the above input image data 202 captured by the endoscope and composed of a plurality of color matching functions (CMF) corresponding to the 24 Color Checkers, a correction matrix and a conversion matrix.

For hyperspectral conversion, first the input image data 202 is converted into the XYZ color space to get spectral value of the XYZ color space [XYZ Spectrum]. Use correction matrix C in the following equation (5) to perform correction of endoscopic images. For example, nonlinear response and dark current of the endoscope, inaccurate color separation and color shift of filters (such as white balance) need to be corrected. Thereby the spectral value of the XYZ color space [XYZ Spectrum] is corrected. The corrected X, Y, and Z values [XYZCorrect] are obtained. For example, the average error value of [XYZCorrect] and [XYZSpectrum] in the white light images is 1.40.

Figure 2C:
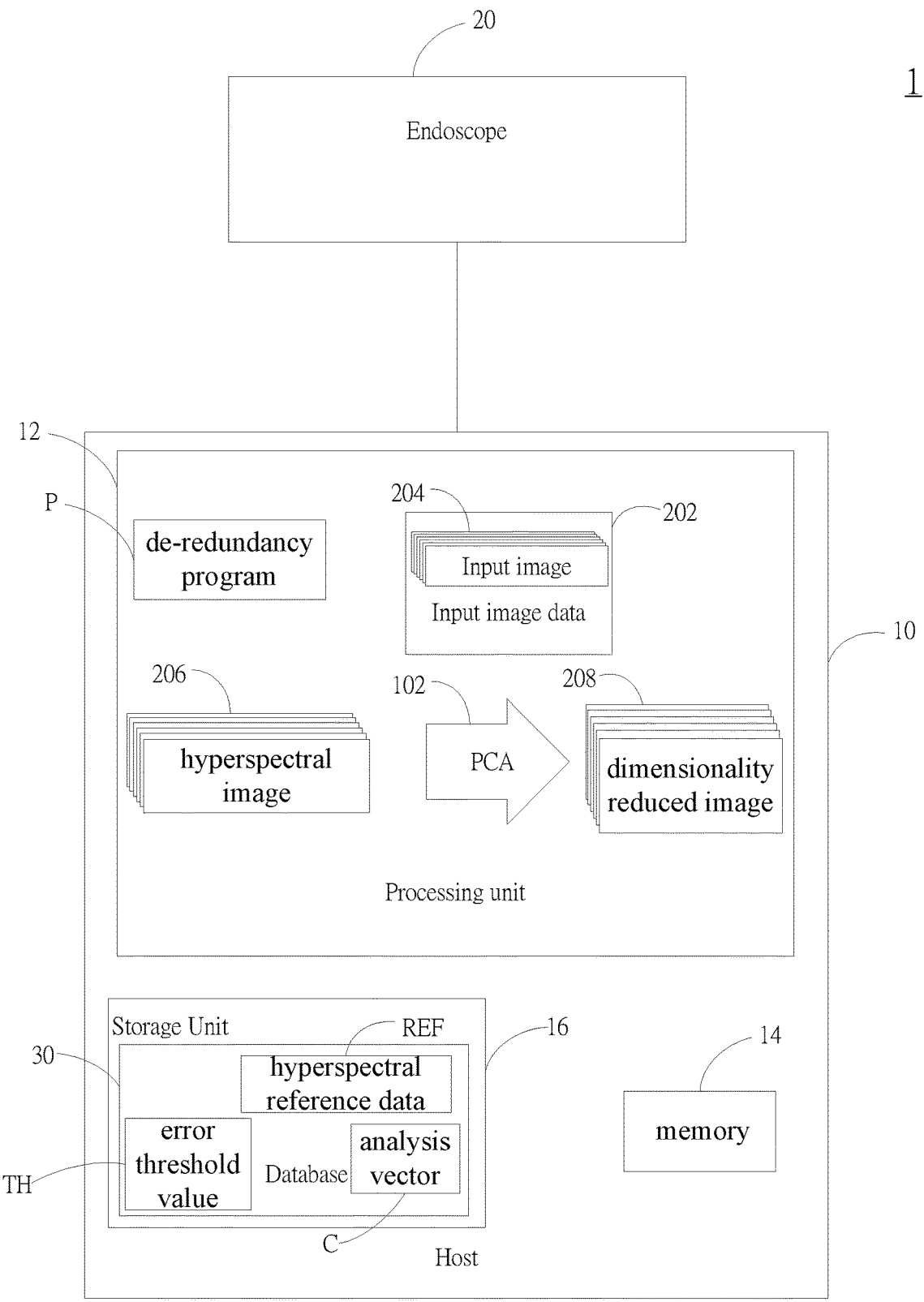

As shown in FIG. 2C, the host 10 runs the step S16. Carry out principal component analysis (PCA) 102 on the hyperspectral images 206 obtained in the step S14 for simplifying image values and removing the image values with lower changes. Then perform simplification according to corresponding eigen vectors of the hyperspectral images 206 to generate a plurality of dimensionality reduced images 208. For example, the following equation (1) is the PCA equation.

$$y_i = a_{j1}(x_{1i} - \bar{x}_1) + a_{j2}(x_{2i} - \bar{x}_2) + \ldots + a_{jn}(x_{ni} - \bar{x}_n)$$ equation (1)

x_1i to x_ni represent spectrum intensity value of the first to the nth wavelength; x⁻_1 to x⁻_n represent expected value of the spectrum (average spectrum intensity) of the first to the nth wavelength; aj1 to ajn represent eigen vector coefficient of a covariance matrix giving the covariance of the spectrum. For example, PCA 102 is used for dimensionality reduction of high dimensional spectral information and only the first three dimensions are obtained to reduce computational complexity. Generally, color images are converted into gray-scale images which are decolored so that computational complexity is further reduced. At the same time, the host 10 can further reduce resolution of the images. For example, a corresponding resolution of the hyperspectral images 206 can be reduced from 640×480 pixels to 128×128 pixels by using the PCA 102. Or the resolution can be reduced with certain magnification such as one half so that the corresponding resolution of the hyperspectral images 206 is reduced from 640×480 pixels to 320×240 pixels to get the dimensionality reduced images 208.

Figure 2D:
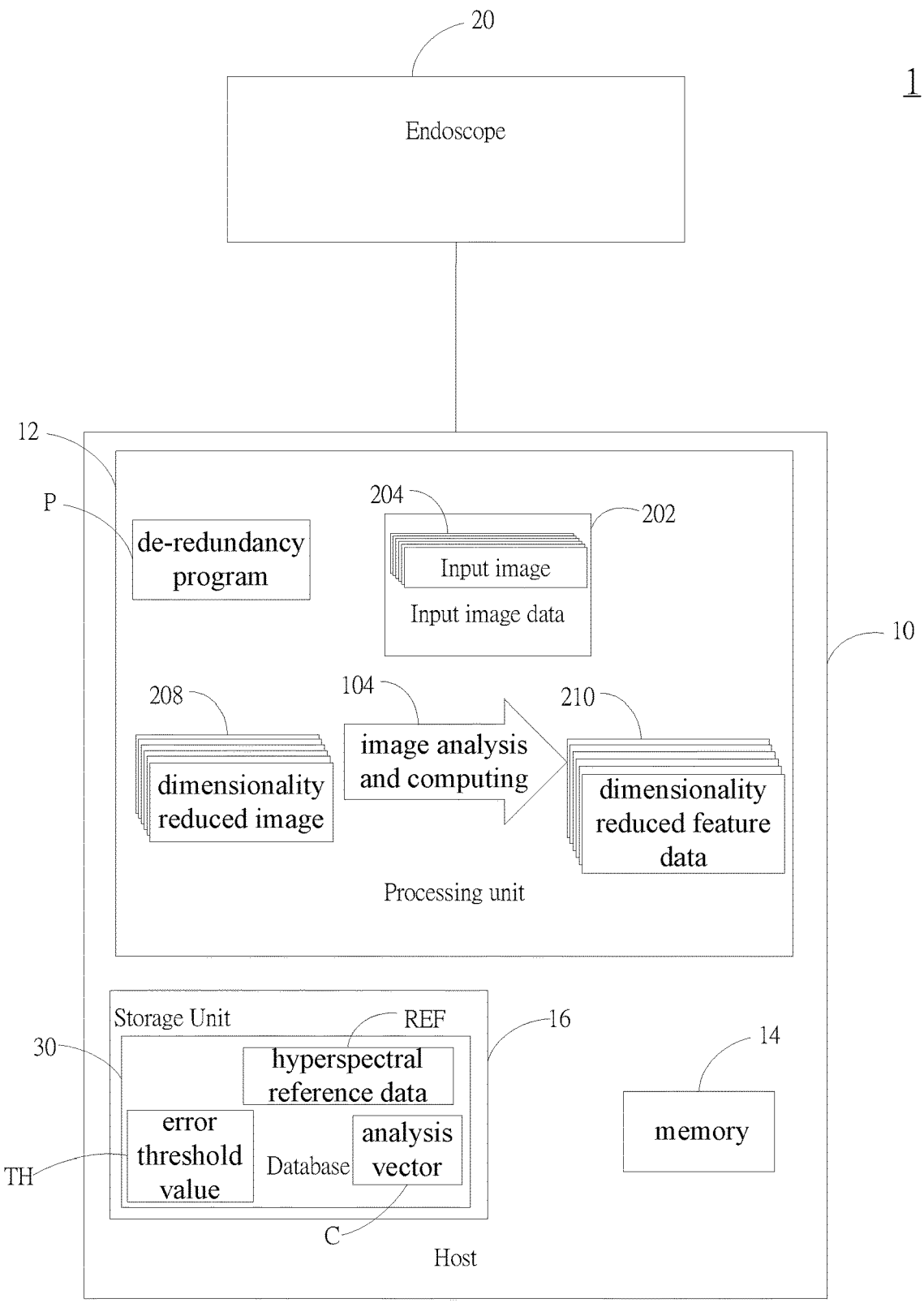

As shown in FIG. 2D, the host 10 runs the step S18, perform an image analysis and computing 104 on the dimensionality reduced images 208 for feature extraction of feature points in the dimensionality reduced images 208. Then a plurality of dimensionality reduced feature data 210 is extracted and obtained according to the dimensionality reduced images 208. For example, the host 10 uses an analysis vector C to analyze the dimensionality reduced images 208 and then get the dimensionality reduced feature data 210.

Figure 2E:
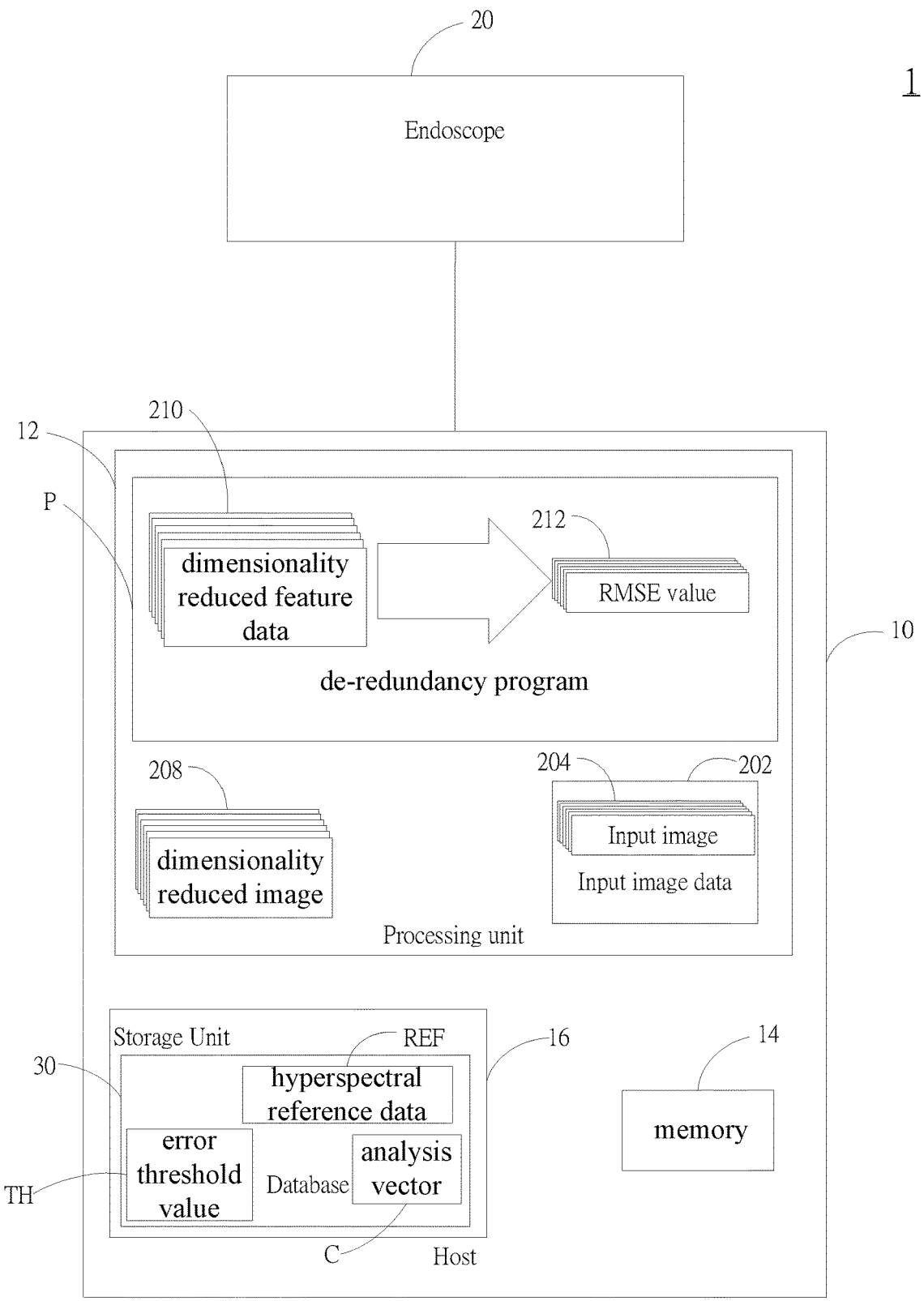
Figure 3:
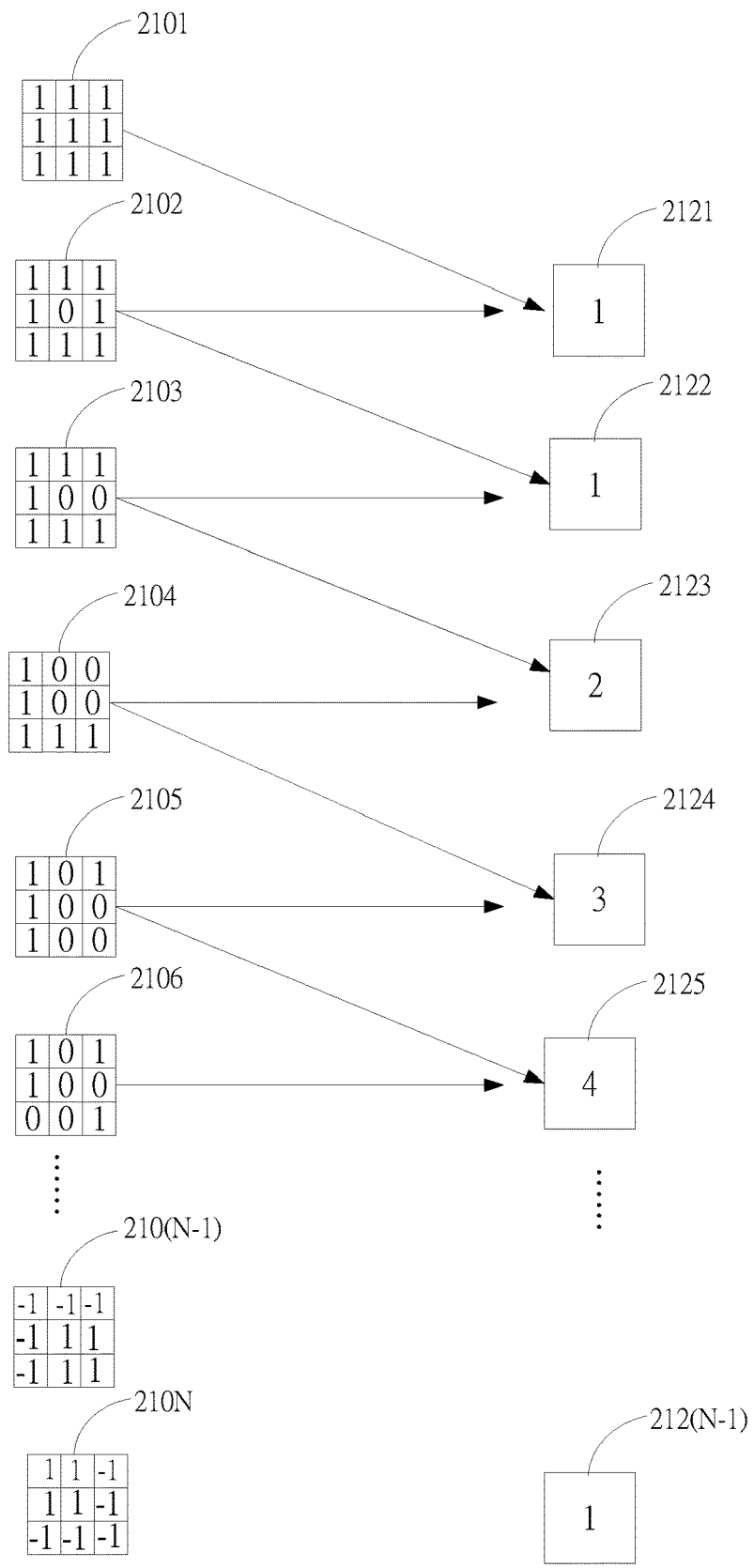
FIG. 3 is a schematic drawing showing how root-mean-square error (RMSE) values are obtained of the first embodiment according to the present invention.

As shown in FIG. 2E, in the step S20, the processing unit 12 of the host 10 executes the de-redundancy program P and makes comparison of the dimensionality reduced feature data 210 corresponding to the input image 204. In this embodiment, each of the dimensionality reduced feature data 210 is compared with one of the adjacent dimensionality reduced feature data to get a plurality of root-mean-square error (RMSE) values 212. As shown in FIG. 3, the dimensionality reduced feature data 210 includes a first feature data 2101, a second feature data 2102, a third feature data 2103 . . . , and a Nth feature data 210N. The host 10 compares the first feature data 2101 with the second feature data 2102 to get a first RMSE value 2121. The host 10 compares the second feature data 2102 with the third feature data 2103 to get a second RMSE value 2122. The host 10 compares the third feature data 2103 with the fourth feature data 2104 to get a third RMSE value 2123. Thereby the N−1th feature data 210 (N−1) and the Nth feature data 210N are compared to get a N−1th RMSE value 212 (N−1). The first RMSE value 2121 is root-mean-square error (RMSE) between the first feature data 2101 and the second feature data 2102. The second RMSE value 2122 is root-mean-square error (RMSE) between the second feature data 2102 and the third feature data 2103. The third RMSE value 2123 is root-mean-square error (RMSE) between the third feature data 2103 and the fourth feature data 2104. The N−1th RMSE value 212 (N−1) is root-mean-square error (RMSE) between the N−1th feature data 210 (N−1) and the Nth feature data 210N.

The RMSE obtained by comparison of the dimensionality reduced feature data is calculated by the following equation (2).

$$RMSE = \frac{\sqrt{\sum_{n=1}^{\infty}\left(((redA(x_n, y_n)) - (redB(x_n, y_n)))^2\right) + \sum_{n=1}^{\infty}\left(((blueA(x_n, y_n)) - (blueB(x_n, y_n)))^2\right) + \sum_{n=1}^{\infty}\left(((greenA(x_n, y_n)) - (greenB(x_n, y_n)))^2\right)}}{3 \times x_n \times y_n}$$ equation (2)

Figure 2F:
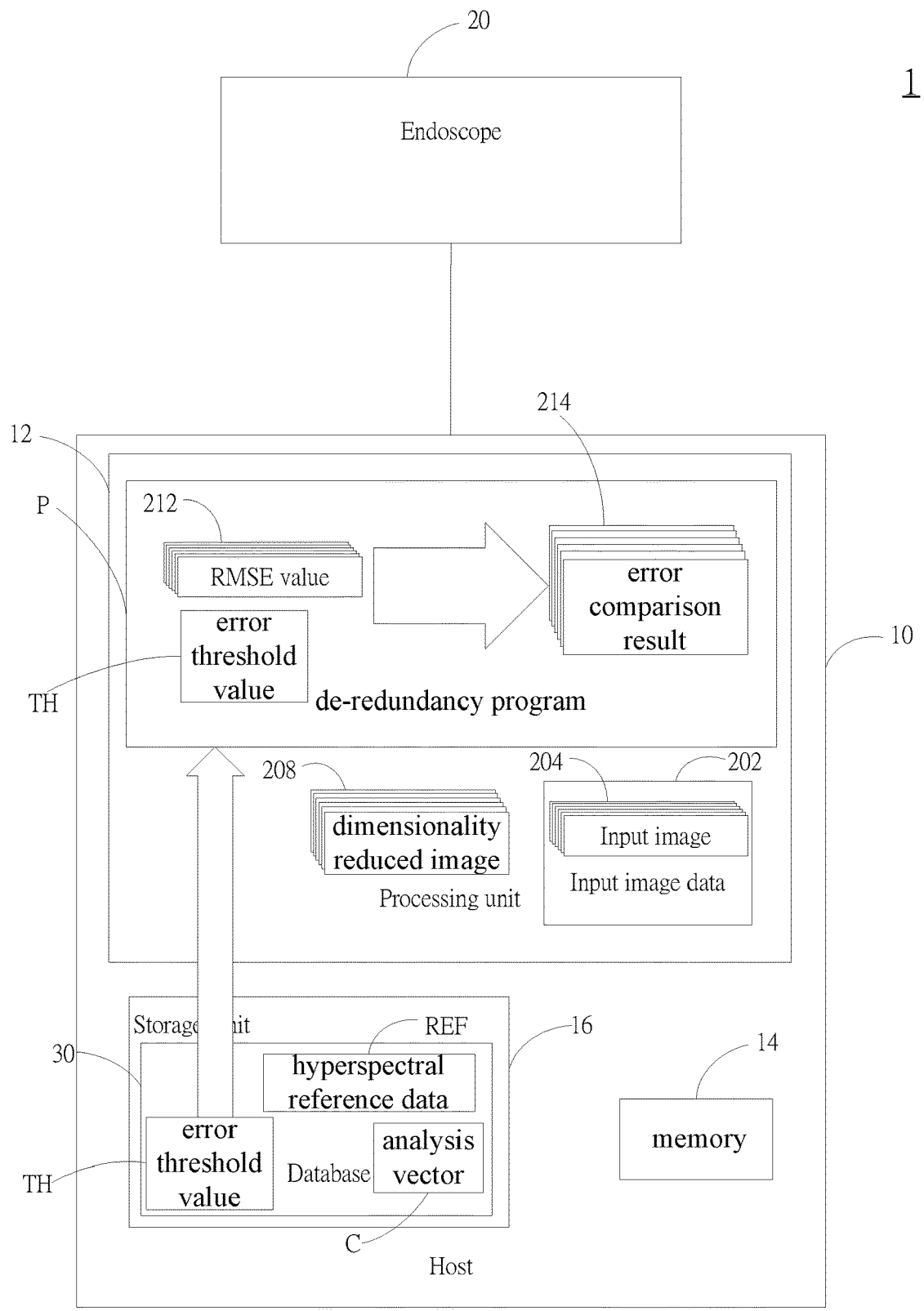

In the step S22, as shown in FIG. 2F, the host 10 reads an error threshold value TH from the database 30 and then compares the RMSE values 212 obtained in the above step S20 with the error threshold value TH to get an error comparison result 214. For example, the first RMSE value 2121, the second RMSE value 2122, the third RMSE value 2123, the fourth RMSE value, and the fifth RMSE value of the RMSE values 212 are respectively 1, 1, 2, 3, and 4 and corresponding to the second dimensionality reduction feature data, the third dimensionality reduction feature data, the fourth dimensionality reduction feature data, the fifth dimensionality reduction feature data, and the sixth dimensionality reduction feature data. Since the error threshold value TH is 3, the second to the fourth dimensionality reduction feature data are marked as the dimensionality reduction feature data not reaching the error threshold value TH and this is used as the error comparison result 214.

Figure 2G:
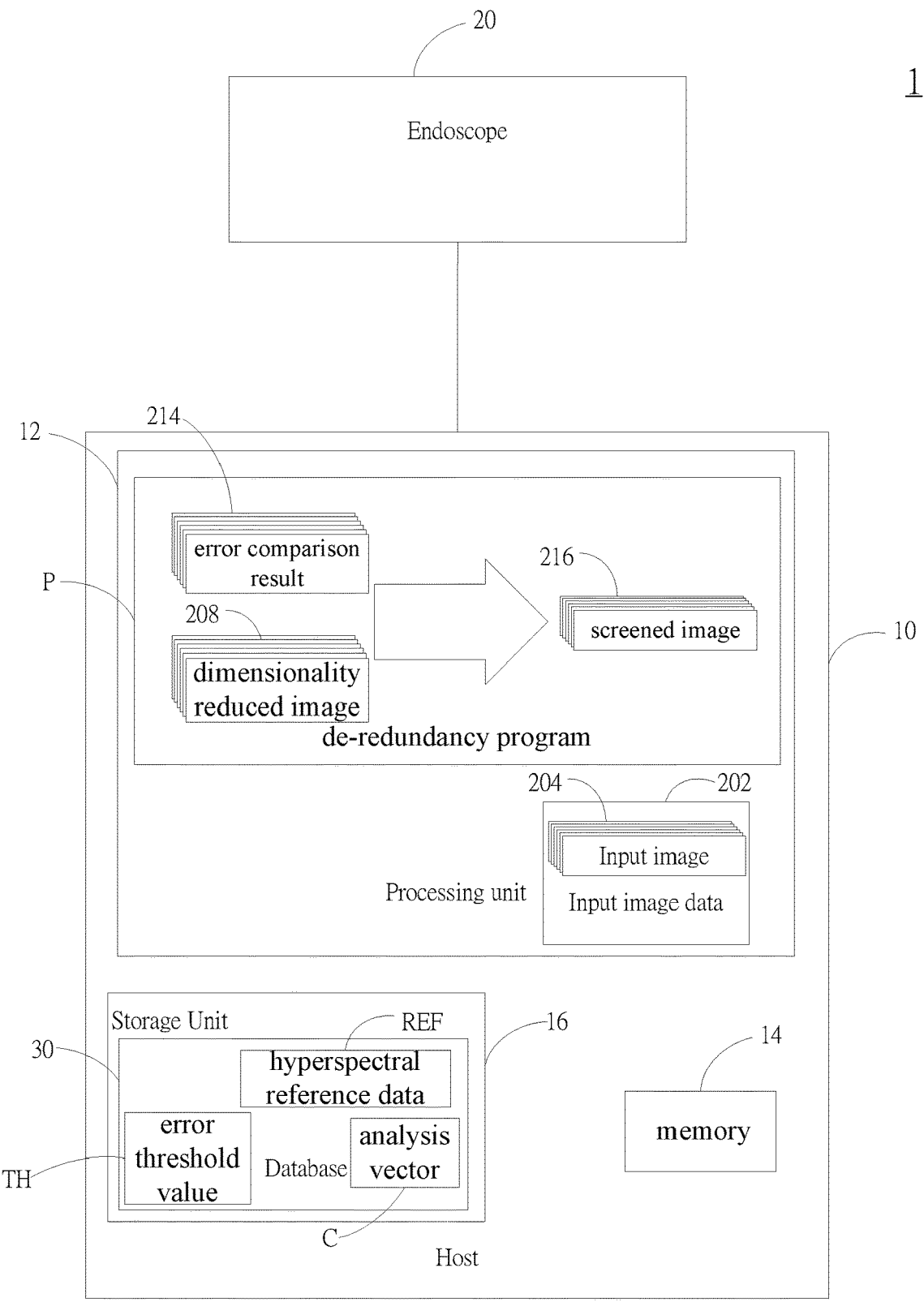

Refer to FIG. 2G, the host 10 deletes dimensionality reduced images 208 corresponding to the RMSE values 212 not reaching the error threshold value TH according to the error comparison result 214 obtained in the step S22 so as to generate a plurality of screened images 216 whose number is smaller than the number of the input images 204 or the number of the dimensionality reduced images 208. For example, the error comparison result 214 in the step S22 is that the second to the fourth dimensionality reduction feature data are marked as the dimensionality reduction feature data not reaching the error threshold value TH. Thereby the host 10 deletes the dimensionality reduced images 208 corresponding to the second to the fourth dimensionality reduction feature data to generate the corresponding screened images 216.

Figure 2H:
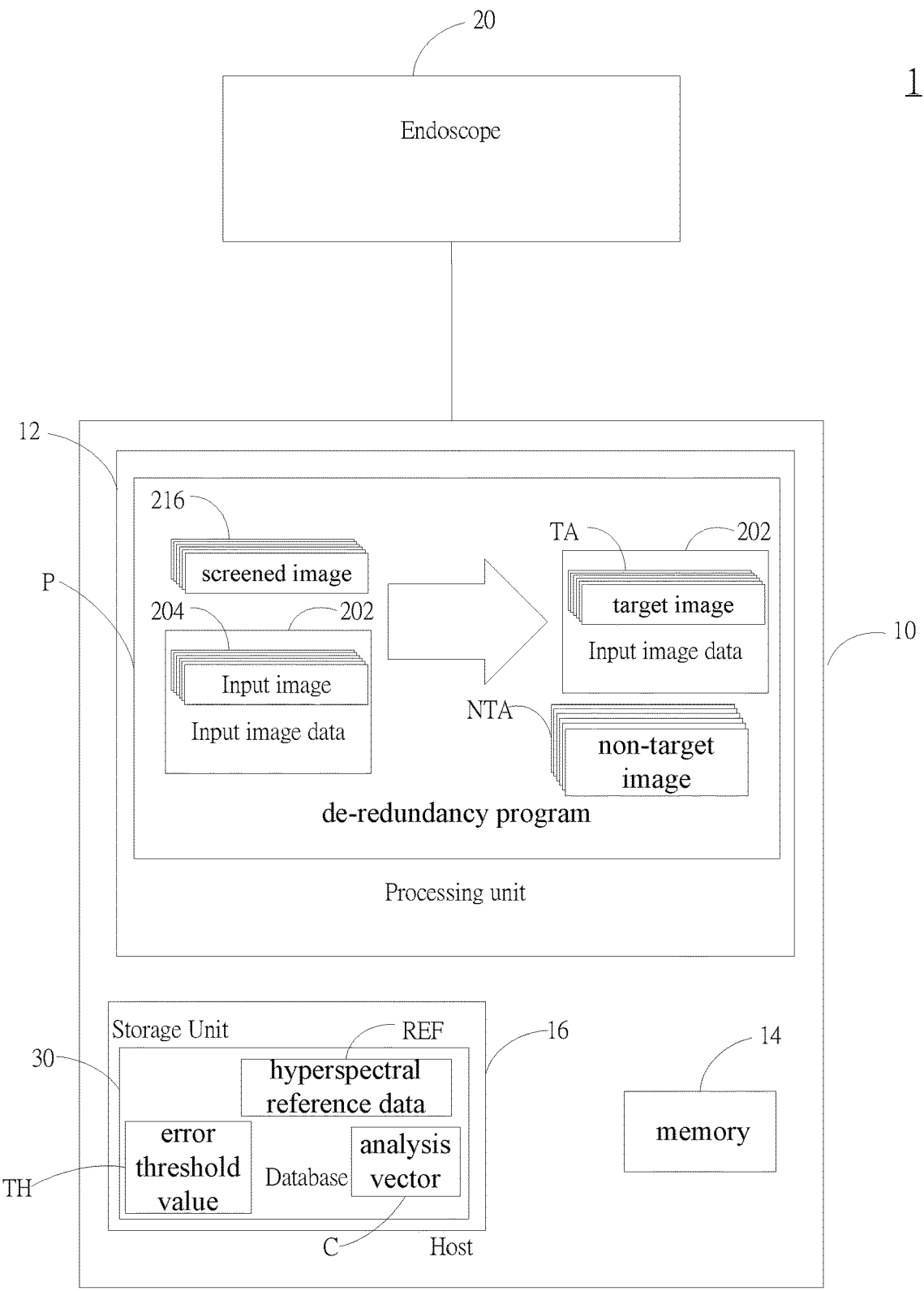

In the step S24, as shown in FIG. 2H, the de-redundancy program P modifies the input image data 202 according to the screened images 216 generated in the step S24. According to an order the screened images 216 correspond to the input images 204, the de-redundancy program P retains a part of the input images 204 in the input image data 202 and deletes the rest of the input images 204. That means the input images 204 corresponding to the screened images 216 are categorized into a group of target images TA by the de-redundancy program P while the input images 204 without corresponding to the screened images 216 are categorized into a group of non-target images NTA and then the NTA is deleted. For example, the screened images 216 are corresponding to the first to the fifth input images of the input image data 202 and the de-redundancy program P marks the first to the fifth input images of the input image data 202 as the target images TA while the rest of the input images 204 of the input image data 202 are labelled as the non-target images NTA. Thereby the non-target images NTA are removed from the input image data 202 by the de-redundancy program P. Therefore, redundant images of the input image data 202 are deleted.

Figure 4:
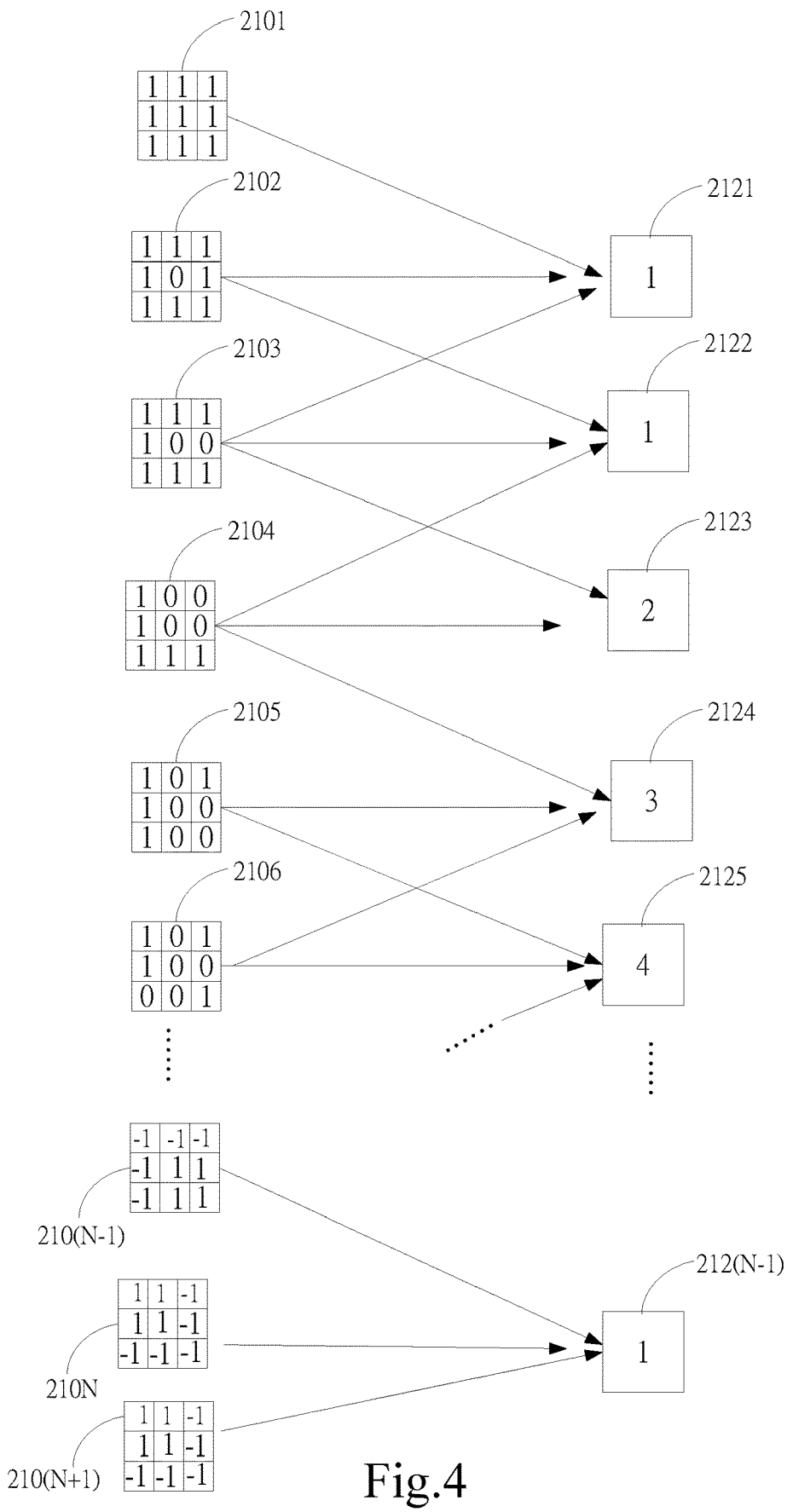
FIG. 4 is a schematic drawing showing how root-mean-square error (RMSE) values are obtained of a second embodiment according to the present invention.

The above comparison of the RMSE values is only an embodiment of the present invention, not intended to limit the present invention. As shown in FIG. 4, computation of RMSE values of a second embodiment of the present invention is provided. The dimensionality reduced feature data 210 includes a first feature data 2101, a second feature data 2102, a third feature data 2103 . . . , and a (N+1)th feature data 210 (N+1). The host 10 compares the first feature data 2101 and the second feature data 2102 with the third feature data 2103 to get a first root-mean-square error (RMSE) value 2121. The host 10 compares the second feature data 2102 and the third feature data 2103 to the fourth feature data 2104 to get a second root-mean-square error (RMSE) value 2122. The host 10 compares the third feature data 2103 and the fourth feature data 2104 to the fifth feature data 2105 to get a third root-mean-square error (RMSE) value 2123. Thereby the N−1th feature data 210 (N−1), the Nth feature data 210N, and the (N+1)th feature data 210 (N+1) are compared to get a N−1th RMSE value 212 (N−1). The first RMSE value 2121 is root-mean-square error (RMSE) among the first feature data 2101, the second feature data 2102, and the third feature data 2103. The second RMSE value 2122 is root-mean-square error (RMSE) among the second feature data 2102, the third feature data 2103, and the fourth feature data 2104. The third RMSE value 2123 is root-mean-square error (RMSE) among the third feature data 2103, the fourth feature data 2104, and the fifth feature data 2105. Thereby the N−1th RMSE value 212 (N−1) is root-mean-square error (RMSE) among the N−1th feature data 210 (N−1), the Nth feature data 210N, and the (N+1)th feature data 210 (N+1). More dimensionality reduced feature data 210 is computed in a similar way to get the corresponding RMSE values.

The following embodiment shows actual operation conditions.

Figure 5:
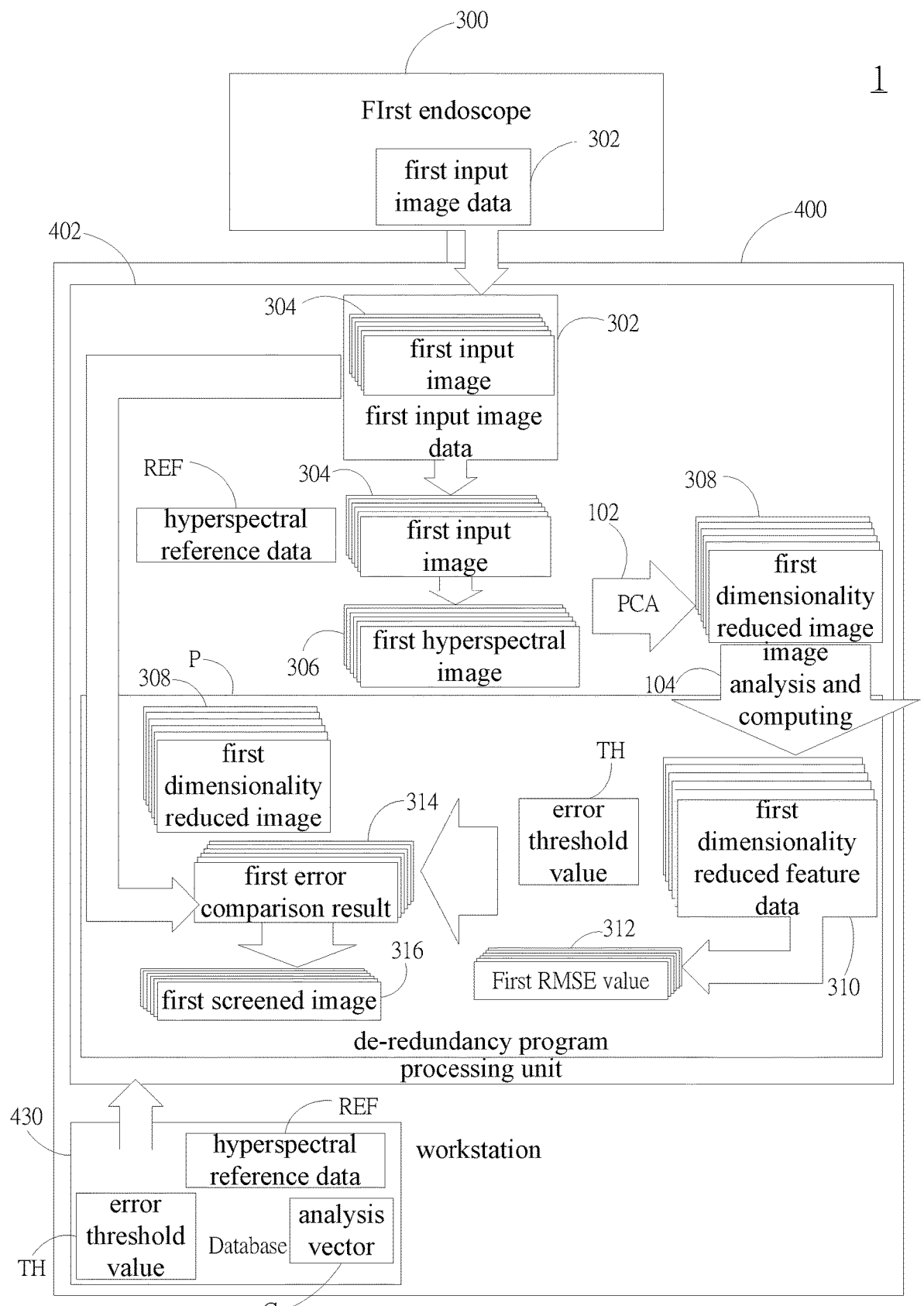
FIG. 5 is a schematic drawing a system of a third embodiment according to the present invention.

As shown in FIG. 5, in a third embodiment, a first endoscope 300 of InsightEyes EGD System sold by Insight Medical Solutions Inc. provides a first input image data 302 to a workstation 400 in which a processing unit 402 is mounted. The processing unit 402 not only runs a de-redundancy program P and reads a hyperspectral reference data REF from a database 430, but also converts a plurality of first input images 304 of the first input image data 302 into a plurality of first hyperspectral images 306 according to the hyperspectral reference data REF. Then principal component analysis (PCA) 102 is performed to simplify the plurality of the first hyperspectral images 306 into a plurality of first dimensionality reduced images 308. Next the processing unit 402 performs an image analysis and computing 104 to get a plurality of first dimensionality reduced feature data 310 according to a plurality of feature points in the first dimensionality reduced images 308. Then the processing unit 402 executes the de-redundancy program P to get a plurality of first root-mean-square error (RMSE) values 312 corresponding to the first dimensionality reduced feature data 310 by comparing each of the first dimensionality reduced feature data 310 with at least one adjacent first dimensionality reduced feature data 310. The processing unit 402 executes the de-redundancy program P to get a first error comparison result 314 by comparison of the first RMSE values 312 with a threshold value TH. The processing unit 402 continues to run the de-redundancy program P to remove images not reaching the threshold value TH from the first dimensionality reduced images 308 according to the first error comparison result 314 and get a plurality of first screened images 316. Later the host 10 modifies the first input image data 302 according to the first screened images 316. That means redundant images in the first input image data 302 are deleted.

Figure 6:
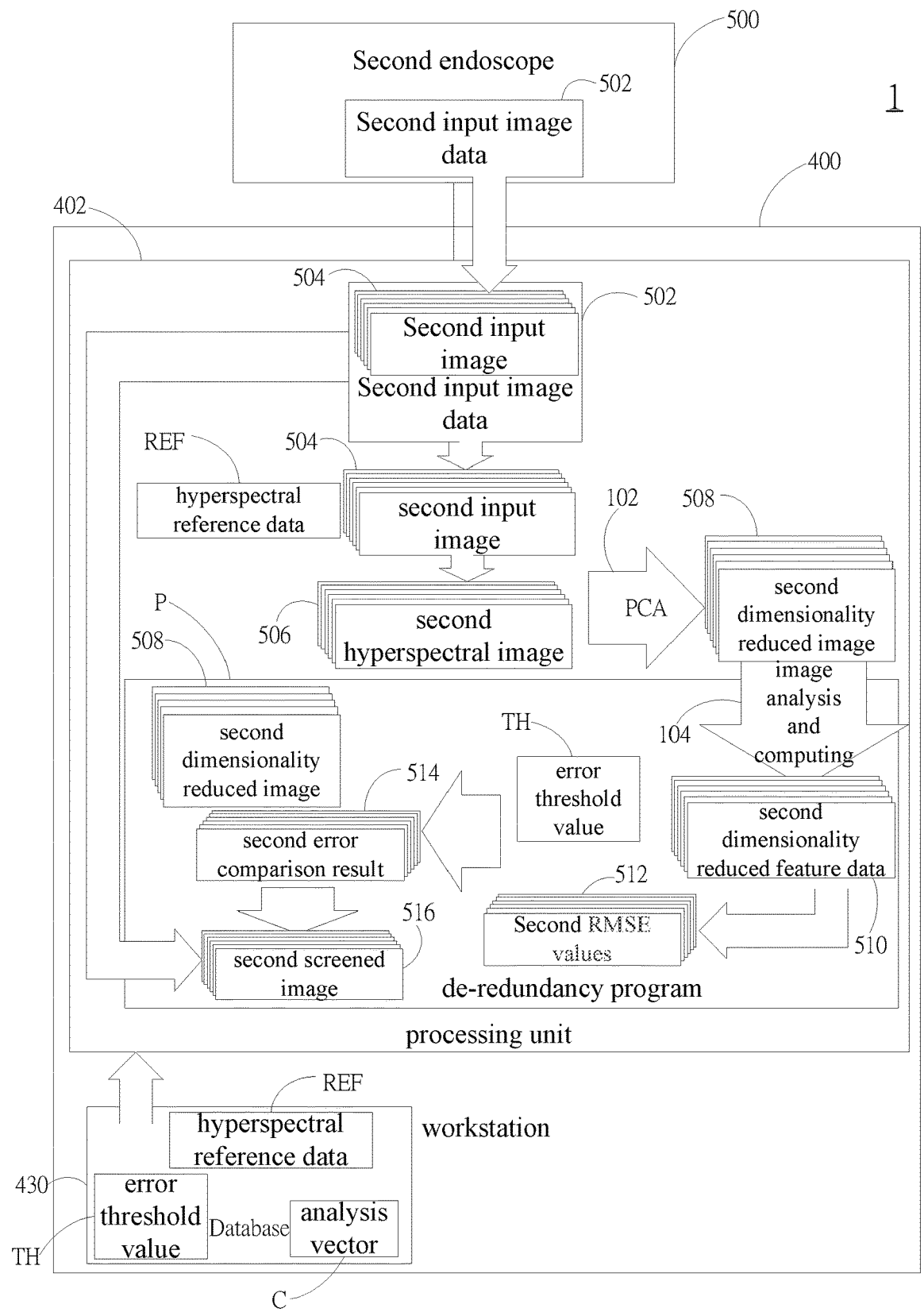
FIG. 6 is a schematic drawing a system of a fourth embodiment according to the present invention.

As shown in FIG. 6, in a fourth embodiment, a second endoscope 500 of Olympus CV-290 system provides a second input image data 502 to a workstation 400. A processing unit 402 of the workstation 400 not only reads a hyperspectral reference data REF from a database 430, but also converts a plurality of second input images 504 of the second input image data 502 into a plurality of second hyperspectral images 506 according to the hyperspectral reference data REF. Then principal component analysis (PCA) 102 is executed to simplify the plurality of the second hyperspectral images 506 into a plurality of second dimensionality reduced images 508. Next the processing unit 402 performs an image analysis and computing 104 to get a plurality of second dimensionality reduced feature data 510 according to a plurality of feature points in the second dimensionality reduced images 508. Then the processing unit 402 executes a de-redundancy program P to get a plurality of second root-mean-square error (RMSE) values 512 corresponding to the second dimensionality reduced feature data 510 by comparing the respective second dimensionality reduced feature data 510 with at least one adjacent second dimensionality reduced feature data 510. The processing unit 402 executes the de-redundancy program P to get a second error comparison result 514 by comparison of the second RMSE values 512 with a threshold value TH. The processing unit 402 continues to run the de-redundancy program P to remove images not reaching the threshold value TH according to the second error comparison result 514 and get a plurality of second screened images 516. Later the host 10 modifies the second input image data 502 according to the second screened images 516. That means redundant images in the second input image data 502 are deleted.

Figure 7:
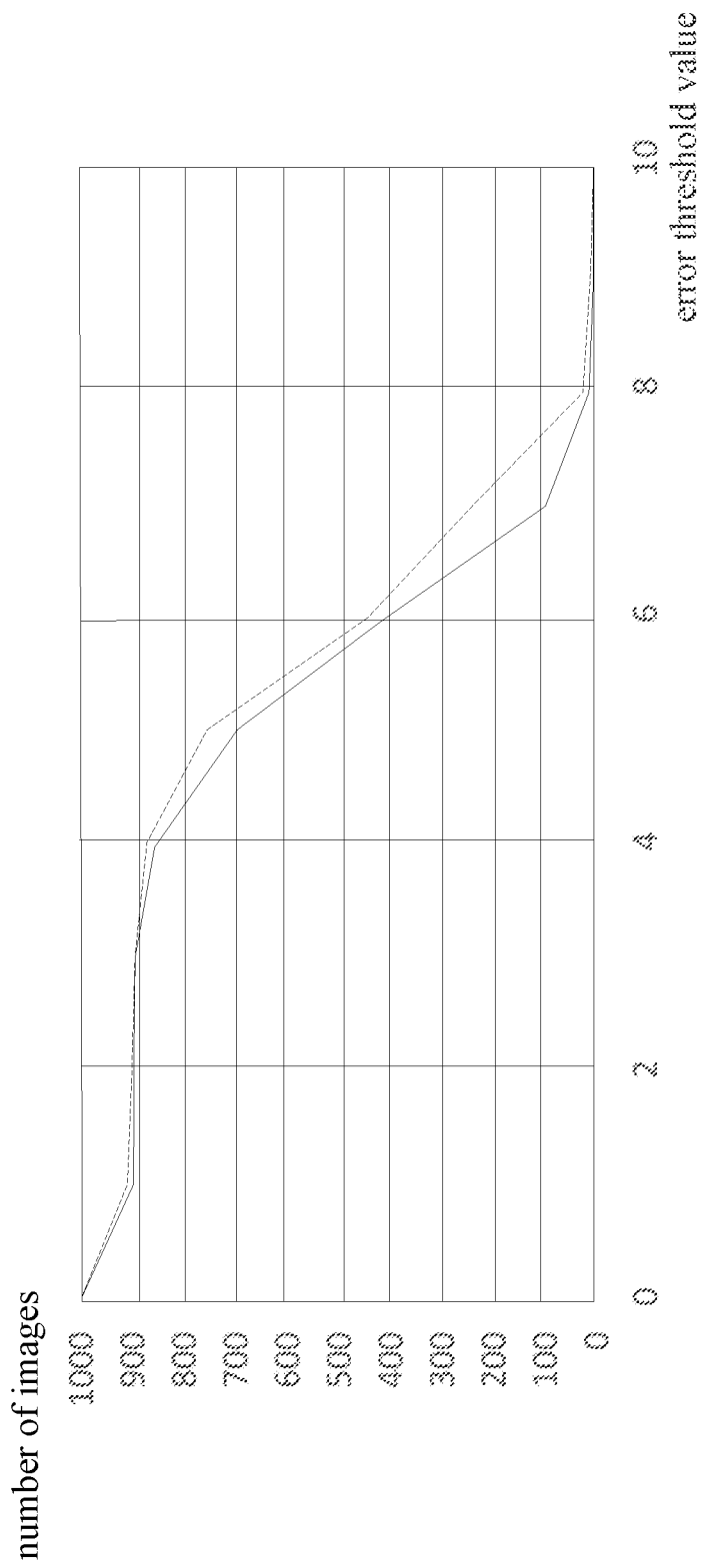
FIG. 7 is a curve chart showing the third embodiment and the fourth embodiment after removal of redundant images by an embodiment according to the present invention.

Refer to FIG. 7, a curve chart of the number of images of the first input image data 302 of the third embodiment and the second input image data 502 of the fourth embodiment after removal of redundant images by the present invention versus error threshold value is provided. The solid-line curve represents the number of the first input images 304 left after removal of the redundant images from the first input image data 302 while the dashed-line curve represents the number of the second input images 504 left after removal of the redundant images from the second input image data 502. An initial number of the first input images 304 of the third embodiment and an initial number of the second input images 504 of the fourth embodiment are set as 1000 pieces of images. By the de-redundancy program P with the error threshold value TH of 0-10, the number of the images in both the first input image data 302 and the second input image data 502 changes. The change is linear when the error threshold value TH is 4-8. While the error threshold value TH is larger than 8, the number of the images approaches 1. That means only the first piece of the first input images 304 and the first piece of the second input images 504 are left. When the error threshold value TH is smaller than 4, the curve showing the change of the number of the images gets flatter.

In summary, the method for deleting redundant images of endoscopes according to the present invention includes a plurality of steps. First obtaining an input image data of an endoscope by a host. Then converting input images of the input image data into hyperspectral images and performing dimensionality reduction (such as PCA) on the hyperspectral images to get dimensionality reduced images. Next analyzing the dimensionality reduced images to get dimensionality reduction feature data. Then getting error values by comparing the respective dimensionality reduction feature data with the adjacent one. Next comparing the error values with an error threshold value to get an error comparison result. Then deleting the dimensionality reduced images not reaching the error threshold value according to the error comparison result to get screened images. Lastly the input image data is modified by using the order of the screened images corresponding to the input images and redundant images of the input image data are removed. Therefore, the problem of large amount of data needs to be dealt with during image processing can be solved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method for deleting redundant images of endoscopes comprising the steps of:
    obtaining an input image data of an endoscope by a host;
    retrieving a plurality of input images from the input image data by the host;
    converting the input images into a plurality of hyperspectral images according to a hyperspectral reference data by the host;
    performing a principal component analysis (PCA) on the hyperspectral images by the host to generate a plurality of dimensionality reduced images;
    performing an image analysis and computing according to the dimensionality reduced images to get dimensionality reduction feature data by the host;
    performing an error calculation between each of the dimensionality reduction feature data ranging from the second dimensionality reduction feature data to the last dimensionality reduction feature data and at least one of the adjacent dimensionality reduced feature data to get a plurality of root-mean-square error (RMSE) values by the host;
    comparing the RMSE values with an error threshold value and deleting the dimensionality reduced images with the RMSE values not reaching the error threshold value to get a plurality of screened images by the host; and
    modifying the input image data according to the screened images by the host, wherein in the step of performing a principal component analysis (PCA) on the hyperspectral images by the host to generate a plurality of dimensionality reduced images, the host converts the hyperspectral images into a plurality of gray-scale images and reduces resolution to generate the plurality of dimensionality reduced images.

2. The method as claimed in claim 1, wherein the input image data is a static image data or a dynamic image data.

3. The method as claimed in claim 1, wherein in the step of retrieving a plurality of input images from the input image data by the host, the host retrieves at least a part of image data from the input image data and converts the image data into frames to get the input images.

4. The method as claimed in claim 1, wherein the hyperspectral reference data is corresponding to the endoscope.

5. The method as claimed in claim 1, wherein in the step of performing an image analysis and computing according to the dimensionality reduced images to get dimensionality reduction feature data by the host, the host performs a feature extraction according to a plurality of feature points and an analysis vector of the dimensionality reduced images to get the corresponding dimensionality reduced feature data according to the dimensionality reduced images.

6. The method as claimed in claim 1, wherein in the step of performing an error calculation between each of the dimensionality reduction feature data ranging from the second dimensionality reduction feature data to the last dimensionality reduction feature data and at least one of the adjacent dimensionality reduced feature data to get a plurality of RMSE values by the host, the host compares the respective dimensionality reduction feature data ranging from the second dimensionality reduction feature data to the last dimensionality reduction feature data with at least the previous one adjacent dimensionality reduced feature data to get the plurality of RMSE values correspondingly.

7. The method as claimed in claim 1, wherein in the step of performing an error calculation between each of the dimensionality reduction feature data ranging from the second dimensionality reduction feature data to the last dimensionality reduction feature data and at least one of the adjacent dimensionality reduced feature data to get a plurality of RMSE values by the host, the host compares the respective dimensionality reduction feature data ranging from the second dimensionality reduction feature data to the last dimensionality reduction feature data with at least the previous one and the next one adjacent dimensionality reduced feature data to get the plurality of RMSE values.

8. The method as claimed in claim 1, wherein in the step of comparing the RMSE values with an error threshold value and deleting the dimensionality reduced images with the RMSE values not reaching the error threshold value to get a plurality of screened images by the host, the host reads the error threshold value stored in a storage unit or receives the error threshold value input by an input device.

9. The method as claimed in claim 1, wherein in the step of modifying the input image data according to the screened images by the host, the host keeps a part of the input images in the input image data and deletes the rest of the input images according to an order the screened images correspond to the input images.

* * * * *